US012586332B2

(12) United States Patent
Jiang et al.

(10) Patent No.: US 12,586,332 B2
(45) Date of Patent: Mar. 24, 2026

(54) METHOD, APPARATUS, DEVICE AND STORAGE MEDIUM FOR MANIPULATING VIRTUAL OBJECT

(71) Applicant: Beijing Zitiao Network Technology Co., Ltd., Beijing (CN)

(72) Inventors: Zexin Jiang, Beijing (CN); Haiyu Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 275 days.

(21) Appl. No.: 18/393,957

(22) Filed: Dec. 22, 2023

(65) Prior Publication Data

US 2024/0221333 A1 Jul. 4, 2024

(30) Foreign Application Priority Data

Dec. 29, 2022 (CN) .......................... 202211716422.X

(51) Int. Cl.
*G06T 19/20* (2011.01)
*G06T 7/70* (2017.01)

(52) U.S. Cl.
CPC ................ *G06T 19/20* (2013.01); *G06T 7/70* (2017.01); *G06T 2219/2016* (2013.01)

(58) Field of Classification Search
None
See application file for complete search history.

(56) References Cited

U.S. PATENT DOCUMENTS

2015/0258431 A1* 9/2015 Stafford .................. G06F 3/014
463/31
2016/0098095 A1* 4/2016 Gonzalez-Banos ..... A63F 13/92
345/156
2017/0329488 A1* 11/2017 Welker .................... G06F 3/011

FOREIGN PATENT DOCUMENTS

CN 108604121 A 9/2018
CN 109960403 A 7/2019
(Continued)

OTHER PUBLICATIONS

Krompiec et al. "Enhanced player interaction using motion controllers for first-person shooting games in virtual reality." IEEE Access 7 (2019): 124548-124557. (Year: 2019).*
(Continued)

*Primary Examiner* — Daniel F Hajnik
*Assistant Examiner* — Jed-Justin Imperial
(74) *Attorney, Agent, or Firm* — Astute IP Law Group

(57) ABSTRACT

According to the disclosed embodiments, a method, apparatus, device, and storage medium for manipulating a virtual object are provided. The method includes determining a first position of a first manipulation device associated with the virtual environment and a second position of a second manipulation device associated with the virtual environment; determining first orientation information based on the first position and the second position; determining a rotation matrix associated with the virtual object rendered in the virtual environment based on the first orientation information and the second orientation information of the first manipulation device; and determining the pose of the virtual object in the virtual environment based on the rotation matrix. Therefore, the user can manipulate the virtual object in the virtual environment to perform expected and natural rotation.

20 Claims, 6 Drawing Sheets

(56)                    References Cited

FOREIGN PATENT DOCUMENTS

| CN | 108648238 | A | 9/2021 |
| CN | 114022568 | A | 2/2022 |
| CN | 115068948 | A | 9/2022 |
| CN | 115167663 | A | 10/2022 |
| CN | 115328304 | A | 11/2022 |
| CN | 115494776 | A | 12/2022 |

OTHER PUBLICATIONS

Office Action for Chinese Patent Application No. 202211716422.X, mailed on May 16, 2025, 18 pages.

* cited by examiner

100

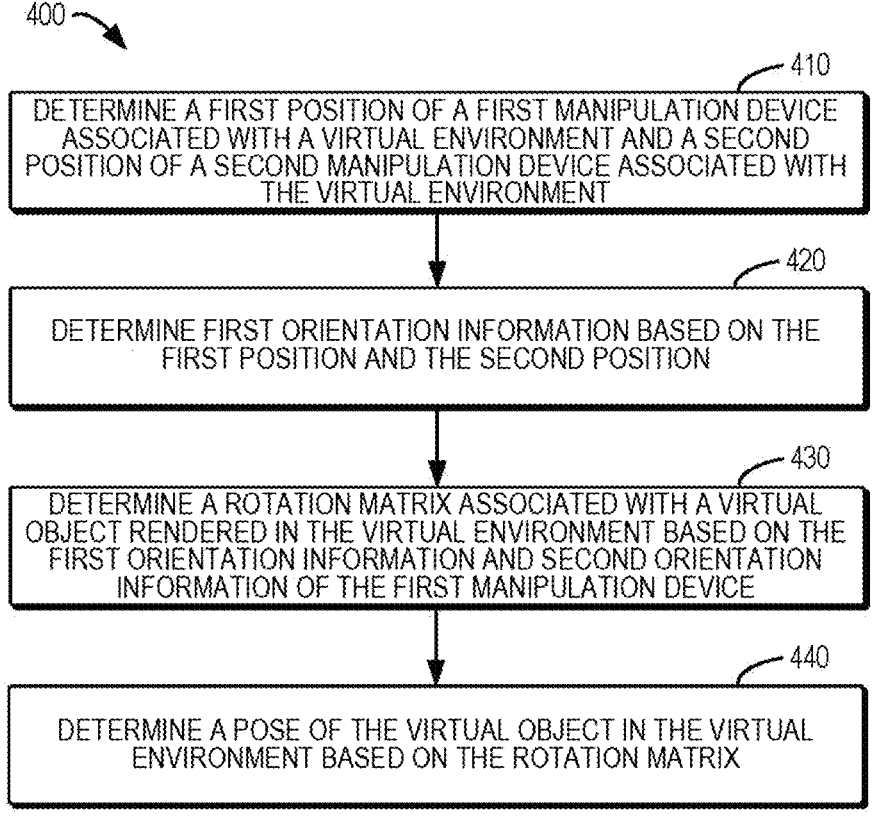

400

410

DETERMINE A FIRST POSITION OF A FIRST MANIPULATION DEVICE ASSOCIATED WITH A VIRTUAL ENVIRONMENT AND A SECOND POSITION OF A SECOND MANIPULATION DEVICE ASSOCIATED WITH THE VIRTUAL ENVIRONMENT

420

DETERMINE FIRST ORIENTATION INFORMATION BASED ON THE FIRST POSITION AND THE SECOND POSITION

430

DETERMINE A ROTATION MATRIX ASSOCIATED WITH A VIRTUAL OBJECT RENDERED IN THE VIRTUAL ENVIRONMENT BASED ON THE FIRST ORIENTATION INFORMATION AND SECOND ORIENTATION INFORMATION OF THE FIRST MANIPULATION DEVICE

440

DETERMINE A POSE OF THE VIRTUAL OBJECT IN THE VIRTUAL ENVIRONMENT BASED ON THE ROTATION MATRIX

FIG. 4

METHOD, APPARATUS, DEVICE AND STORAGE MEDIUM FOR MANIPULATING VIRTUAL OBJECT

CROSS REFERENCE

This application claims priority to the Chinese patent application filed with the Chinese Patent Office on Dec. 29, 2022, with application number 202211716422.X, the entire contents of which are incorporated herein by reference.

FIELD

Example embodiments of the present disclosure generally relate to the field of computers, and in particular to a method, apparatus, devices and computer-readable storage media for manipulating virtual objects.

BACKGROUND

Extended Reality (XR) technology includes Virtual Reality (VR), Augmented Reality (AR), and Mixed Reality (MR). With the advancement of Extended Reality technology, constructing virtual scenes is not limited to simple viewing, but more about interacting with virtual objects, such as simulating holding virtual objects with both hands.

SUMMARY

In the first aspect of the present disclosure, a method for manipulating a virtual object is provided. The method includes: determining a first position of a first manipulation device associated with the virtual environment and a second position of a second manipulation device associated with the virtual environment; determining first orientation information based on the first position and the second position; determining a rotation matrix associated with the virtual object rendered in the virtual environment based on the first orientation information and the second orientation information of the first manipulation device; and determining the pose of the virtual object in the virtual environment based on the rotation matrix.

In the second aspect of the present disclosure, an apparatus for manipulating a virtual object is provided. The apparatus comprises: a position determination module configured to determine a first position of a first manipulation device associated with the virtual environment and a second position of a second manipulation device associated with the virtual environment; an orientation information determination module configured to determine a first orientation information based on the first position and the second position; a rotation matrix determination module configured to determine a rotation matrix associated with a virtual object rendered in the virtual environment based on the first orientation information and the second orientation information of the first manipulation device; and a pose determination module configured to determine the pose of the virtual object in the virtual environment based on the rotation matrix.

In the third aspect of the present disclosure, an electronic device is provided. The device includes at least one processing unit; and at least one memory, the at least one memory being coupled to the at least one processing unit and storing instructions for execution by the at least one processing unit. The instructions cause the device to perform the method of the first aspect when executed by the at least one processing unit.

In the fourth aspect of the present disclosure, a computer-readable storage medium is provided. The computer-readable storage medium stores a computer program that can be executed by a processor to implement the method of the first aspect.

It should be understood that the content described in the content section of the present invention is not intended to limit the key features or important features of the embodiments of the present disclosure, nor is it intended to limit the scope of the present disclosure. Other features of the present disclosure will be easily understood by the following description.

BRIEF DESCRIPTION OF THE DRAWINGS

In conjunction with the accompanying drawings and with reference to the following detailed description, the above and other features, advantages, and aspects of each embodiment of the present disclosure will become more apparent. In the drawings, the same or similar reference numerals indicate the same or similar elements, where:

FIG. 4 shows a flowchart of the process of manipulating virtual objects according to some embodiments of the present disclosure.

DETAILED DESCRIPTION

Figure 1:
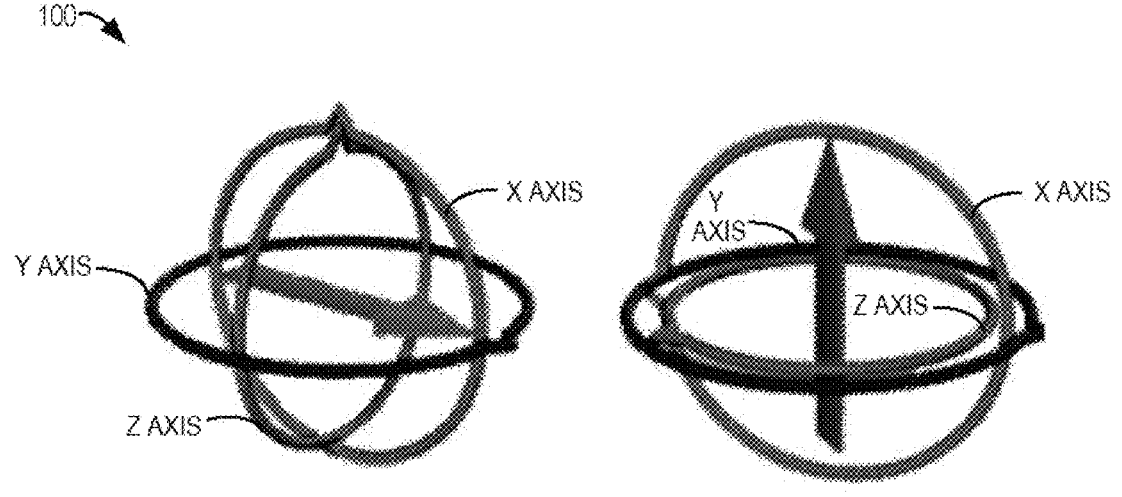
FIG. 1 shows a schematic diagram of the rotation of the Prior Art virtual object.

It will be appreciated that, before using the technical solutions disclosed in the various embodiments of the present disclosure, should be based on relevant laws and regulations through an appropriate manner to inform the user of the type of personal information involved in the present disclosure, the scope of use, usage scenarios, and obtain the user's authorization.

For example, in response to receiving an active request from a user, a prompt message is sent to the user to explicitly prompt the user that the operation requested to be performed will require acquisition and use of the user's personal information. Thus, the user can autonomously select whether to provide personal information to software or hardware such as electronic devices, applications, servers, or storage media that perform operations of the disclosed technical solution based on the prompt message.

As an optional but non-limiting implementation, in response to receiving an active request from the user, the prompt information is sent to the user, for example, in the form of a pop-up window, which can present the prompt information in the form of text. In addition, the pop-up window can also carry a selection control for the user to "agree" or "disagree" to provide personal information to the electronic device.

It can be understood that the above notification and user authorization process are only illustrative and do not limit the implementation of this disclosure. Other methods that meet relevant laws and regulations can also be applied to the implementation of this disclosure.

It can be understood that the data involved in this technical solution (including but not limited to the data itself, data acquisition or use) should comply with the requirements of corresponding laws, regulations and relevant provisions.

The following will describe the embodiments of the present disclosure in more detail with reference to the accompanying drawings. Although some embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of protection of the present disclosure.

It should be noted that the titles of any section/sub-section provided in this article are not restrictive. Various embodiments are described throughout this article, and any type of embodiment can be included under any section/sub-section. In addition, the embodiments described in any section/sub-section can be combined in any way with any other embodiments described in the same section/sub-section and/or different sections/sub-sections.

In the description of the embodiments of this disclosure, the term "including" and similar terms should be understood as open-ended inclusion, that is, "including but not limited to". The term "based on" should be understood as "at least partially based on". The terms "one embodiment" or "the embodiment" should be understood as "at least one embodiment". The term "some embodiments" should be understood as "at least some embodiments". The following may also include other explicit and implicit definitions. The terms "first", "second", etc. may refer to different or identical objects. The following may also include other explicit and implicit definitions.

As briefly mentioned earlier, XR technology utilizes hardware devices combined with various software technologies to present virtual scenes or integrate virtual content with real scenes, transforming people's interaction patterns from 2D interaction to 3D interaction. VR technology uses head-mounted devices to simulate 3D interactive scenes in the real world. AR technology uses electronic devices (such as mobile phones, tablets, glasses, etc.) to overlay various information and images onto the real world. MR technology is between VR technology and AR technology, using digital technology to implement complex scenes of real-time interaction between the virtual world, the real world, and users.

In a virtual scene, users hold virtual objects with both hands, and the posture of the virtual object should match the posture of the user's hands as much as possible, so that the user feels that the action naturally interacts with the virtual object. For example, in a shooting game based on VR technology, when the user holds a virtual firearm with both hands, it is necessary to make the posture of the virtual firearm match the posture of the user's hands as much as possible, and give the user the freedom to change the angle of holding the gun, and try not to restrict the user from holding the gun, so as to make the user feel natural and enhance immersion.

The limited rotation of an object in three-dimensional space can be represented by three relative angles, namely precession angle, nutation angle, and spin angle. These three angles are collectively referred to as the Euler angle. The Euler angle can be used to describe the orientation of a rigid body in three-dimensional Euclidean space. However, when using the Euler angle to describe the rotation of an object, there will be a problem of "universal deadlock".

FIG. 1 shows a schematic diagram of the rotation of the universal joint in Prior Art. The working mode of the universal joint is exactly the same as the way the Euler angle expresses rotation, so the universal deadlock problem of the Euler angle can be explained by the universal joint. The universal joint includes three interconnected ring arms. Each ring arm represents a different axis, for example, the three ring arms represent the X-axis, Y-axis, and Z-axis respectively. The arrow in the middle represents the object. When describing the posture of an object using the Euler angle, the rotation order of the three axes must be determined, for example, Y-axis→X-axis→Z-axis. The Y-axis is the parent level of the X-axis, and the X-axis is the parent level of the Z-axis. The rotation of the parent level will drive all sub-levels to rotate, while the rotation of the sub-levels does not affect the state of the parent level. Specifically, when the Y-axis rotates, it will drive the X-axis, Z-axis, and arrow to rotate together. When the X-axis rotates, it will drive the Z-axis and arrow to rotate together. When the Z-axis rotates, it will only drive the arrow to rotate. When rotating the ring arms of the X-axis, there is a probability that the ring arms of the Y-axis and the Z-axis are in the same plane (as shown in the right figure in FIG. 1). At this time, the functions of the ring arms of the Y-axis and the Z-axis are basically equivalent. Only the ring arms of the two axes of the entire universal joint work normally, and the arrows inside can no longer maintain their original balance state. This phenomenon is called universal deadlock. At this time, if the arrows are to continue to rotate to the required position, the ring arms of three axes must be rotated at the same time. However, the trajectory of this rotation process in actual space is an arc, which makes the arrow in the middle unable to rotate in the expected straight line, and unreasonable rotation cannot meet the practical engineering application. Adjusting the rotation order of the three axes will change the probability that two ring arms are coplanar, but it cannot completely eliminate the problem of falling into universal deadlock at a certain angle.

Specifically in virtual scenes, when using Euler angle to describe the rotation of virtual objects, for example, in the order of Y-axis→X-axis→Z-axis, when the pitch angle of the virtual object reaches 90°, an axis will be lost, making it unnatural for the object to continue to rotate from 90°. Especially when dealing with the rotation of virtual objects held by both hands, the posture of the held object is determined by the posture of both hands. When performing posture calculation and merging based on each hand, serious lag will occur and cannot be used. Some products use quaternions to provide smooth interpolation and avoid the problem of Gimbal deadlock, but it is difficult to consider the influence of both hands' posture on object rotation at the same time.

According to various embodiments of the present disclosure, a first position of the first manipulation device associated with the virtual environment and a second position of the second manipulation device associated with the virtual environment are determined. Based on the first position and the second position, the first orientation information is determined. Based on the first orientation information and the second orientation information of the first manipulation device, a rotation matrix associated with the virtual object rendered in the virtual environment is determined. Based on the rotation matrix, the pose of the virtual object in the virtual environment is determined. Therefore, the user can manipulate the virtual object in the virtual environment to rotate smoothly and naturally as expected.

The following describes exemplary embodiments of the present disclosure with reference to the accompanying drawings.

Figure 2:
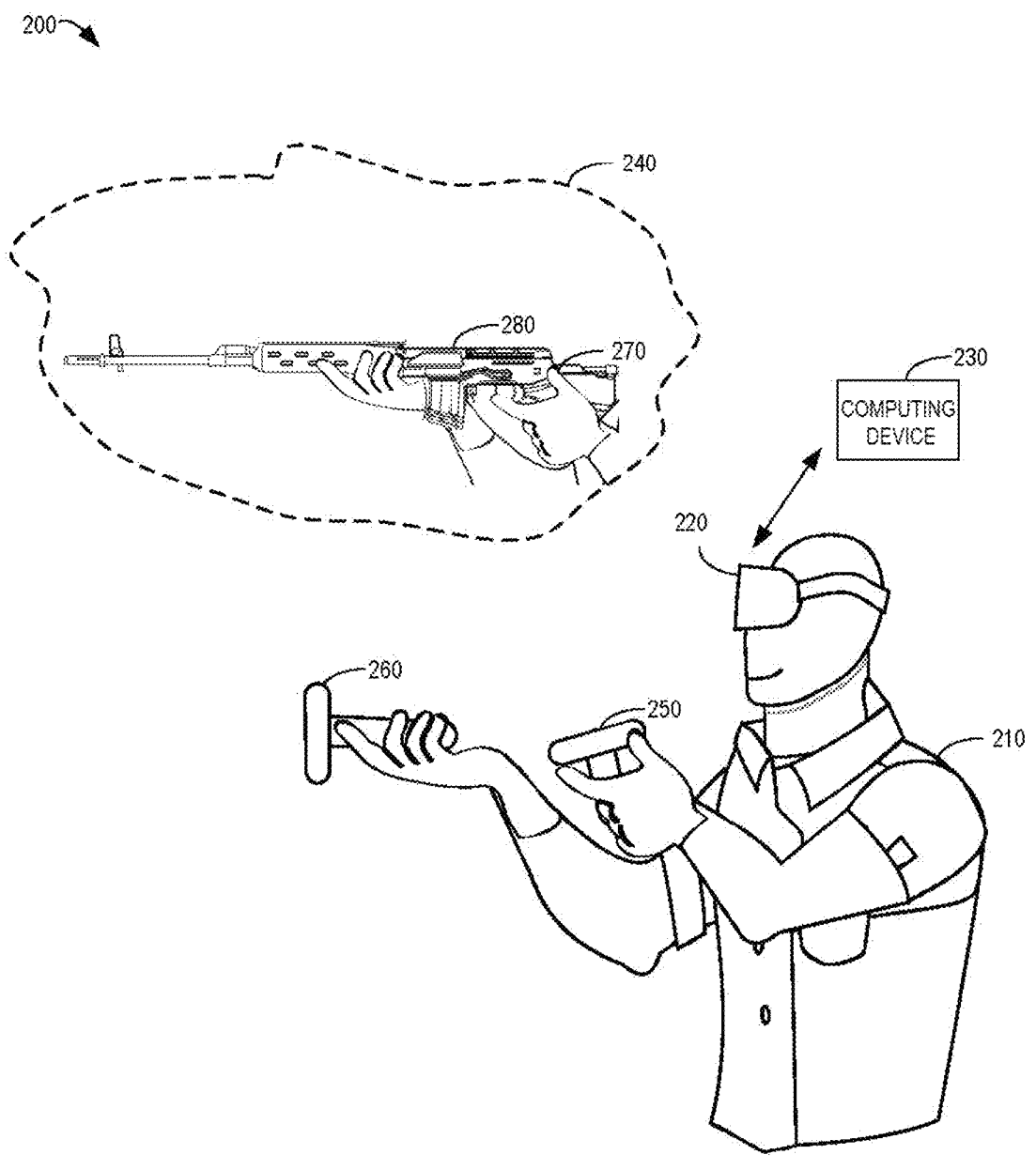
FIG. 2 shows a schematic diagram of an example environment in which the present disclosure can be implemented.

FIG. 2 shows a schematic diagram of an example environment 200 in which an embodiment of the present disclosure can be implemented. In the environment 200, the user 210 wears the XR device 220. The XR device 220 communicates with the computing device 230 to reconstruct a virtual scene for the user 210 or merge the virtual content with the real scene. In some embodiments, the XR device 220 and the computing device 230 can also be designed in an integrated manner. In this disclosure, virtual scenes reconstructed based on VR technology and scenes that merge virtual content with real scenes based on AR technology or MR technology are collectively referred to as virtual scenes 240 (as shown in the dashed box in FIG. 2).

XR device 220 can be a head-mounted or wearable near-eye display device, such as Head Mounted Display, smart glasses, etc., supporting VR, AR, MR and other technologies. XR device 220 can include image generation components and optical display components for reconstructing virtual scenes 240 in a monocular or binocular field of view and displaying the user's virtual hands 270 and virtual objects 280. The virtual object 280 can be a Game Prop or other three-dimensional element, and the disclosed embodiments are not limited thereto.

The first manipulation device 250 and the second manipulation device 260 can be handheld manipulation devices, such as handles, bracelets, or rings. The first manipulation device 250 and the second manipulation device 260 can include motion sensors, and the computing device 230 receives sensor data for controlling the virtual hands 270 corresponding to the user 210 to perform corresponding actions in the virtual scene 240. In some embodiments, the hands of the user 210 respectively hold the first manipulation device 250 and the second manipulation device 260. For example, in the virtual scene of a VR shooting game, the virtual hands 270 corresponding to the user 210 are presented as holding virtual firearms with both hands.

The computing device 230 may be a separate device capable of communicating with the XR device 220, the first manipulation device 250, and the second manipulation device 260, such as a server for image or data processing, a computing node, etc., or may be integrated with the XR device 220. In some embodiments, the computing device 230 may be implemented as the XR device 220, that is, in this case, the XR device 220 may implement all the functions of the computing device 230. It should be understood that the above description of the computing device 230 is only illustrative and not restrictive, and the computing device 230 may be implemented as a device of various forms, structures, or categories, which are not limited by the disclosed embodiments.

It should be understood that the structure and function of Environment 200 are described for illustrative purposes only, without implying any limitation on the scope of the present disclosure.

The following will continue to describe some exemplary embodiments of the present disclosure with reference to the accompanying drawings.

In order to avoid the gimbal deadlock problem, and to consider the effect of the two-hand posture on the rotation of the gripped object, various embodiments of the present disclosure use a rotation matrix to describe the rotation of the object. Continuing to refer to FIG. 2, in the virtual scene 240, the virtual hands 270 hold the virtual object 280, and the pose of the virtual object 280 can be derived from the position of the virtual hands 270 in conjunction with the rotation matrix.

In some embodiments, the computing device 230 determines a first position of the first manipulation device 250 associated with the virtual environment 240 and a second position of the second manipulation device 260 associated with the virtual environment 240.

It should be understood that the computing device 230 can determine the position and/or posture of the manipulation device in a corresponding appropriate manner depending on the type of manipulation device used. For example, the computing device 230 can collect pose data by manipulating the device's sensors and determine the position of the manipulation device in physical space through methods such as image positioning. The present disclosure is not intended to limit the determination of the position and/or posture information of the manipulation device.

Various embodiments of the present disclosure use a rotation matrix to describe the relationship between the coordinate systems where the virtual object 280 is located before and after rotation. The coordinate system where the virtual object 280 is located before rotation is the coordinate system where the virtual hands 270 are located. The positions of the virtual hands 270 correspond to the first position of the first manipulation device 250 and the second position of the second manipulation device 260, respectively. The computing device 230 obtains the first position and the second position, for example, through the interface of the game engine.

In order to ensure that operations are performed in the same coordinate system, it is necessary to obtain the transformations of the first manipulation device 250 and the second manipulation device 260 relative to the same coordinate system. For example, the computing device 230 obtains the transformations of the first manipulation device 250 and the second manipulation device 260 relative to the world coordinate system through the interface of the game engine. To derive the coordinates of the virtual object 280 in its own coordinate system from the coordinates of the virtual hands 270 in the world coordinate system, a rotation matrix needs to be constructed. The world coordinate system is a three-dimensional coordinate system established with the world origin as the coordinate origin. The virtual object's own coordinate system is a three-dimensional coordinate system established with the virtual object as the origin. The virtual object's own coordinate system is a local coordinate system that can define the direction and initial local position of the virtual object 280 itself.

Figure 3:
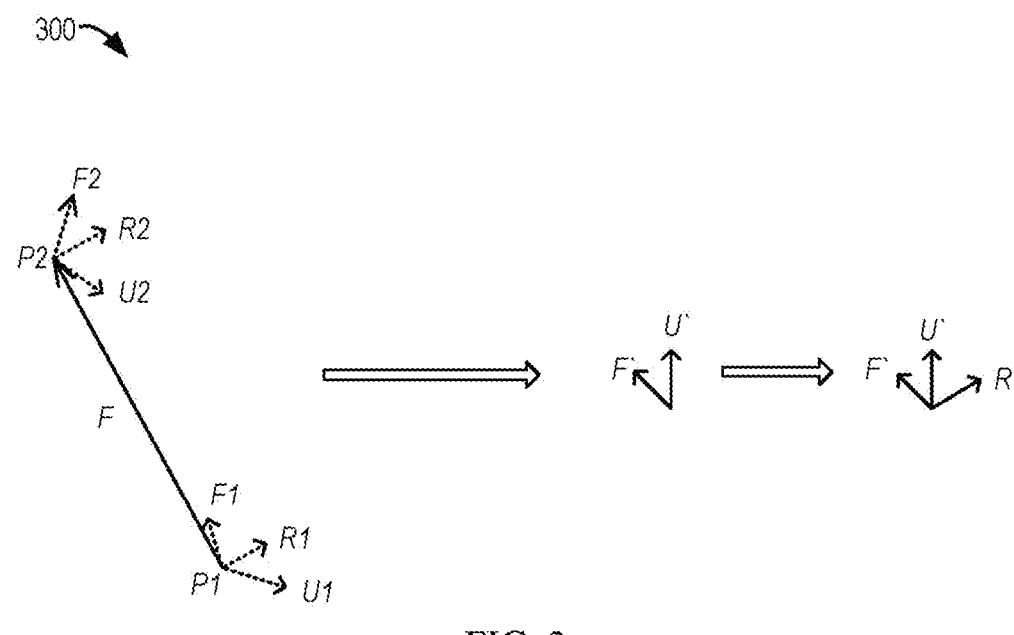
FIG. 3 shows a schematic diagram of an example of determining column vectors in a rotation matrix according to some embodiments of the present disclosure.

FIG. 3 shows a schematic diagram of an example 300 of determining column vectors in a rotation matrix in accordance with some embodiments of the present disclosure. Example 300 describes the process of determining column vectors in a rotation matrix. Assuming that the coordinate system in which the virtual object 280 is located before rotation is the A coordinate system, which is, for example, the virtual engine coordinate system. The coordinate system in which the virtual object 280 is located after rotation is the B coordinate system, which is, for example, the coordinate system of the virtual object 280 itself. Example 300 can be implemented at computing device 230. Example 300 is described below with reference to FIG. 2.

The first position of the first manipulation device 250 in the A coordinate system is P1, represented by three-dimensional vectors F1, U1, and R1. Vectors F1, U1, and R1 are all unit vectors. Vector F1 is coaxial with the X-axis of the coordinate system of the first manipulation device 250 itself, vector U1 is coaxial with the Z-axis, and vector R1 is coaxial with the Y-axis.

The second position of the second manipulation device 260 in the A coordinate system is P2, represented by three-dimensional vectors F2, U2, and R2. Vectors F2, U2, and R2 are all unit vectors. Vector F2 is coaxial with the X-axis of the coordinate system of the second manipulation device 260 itself, vector U2 is coaxial with the Z-axis, and vector R2 is coaxial with the Y-axis.

Assume that the position of virtual object 280 in the B coordinate system is P. The rotation matrix can convert the coordinates of position P in the B coordinate system into coordinates in the A coordinate system, and vice versa. The coordinates of position P in the A coordinate system are determined based on the first position P1 and the second position P2. Therefore, the rotation matrix can be derived based on the first position P1 and the second position P2.

The rotation matrix describes the rotation operation of an object in Cartesian coordinates. For three-dimensional rotation, two dimensions can be derived first and then extended to three dimensions. That is, the two column vectors in the rotation matrix are first obtained, and then the third column vector is obtained.

In some embodiments, the computing device 230 determines the first orientation information based on the first position P1 and the second position P2. Further, the computing device 230 determines the first column vector in the rotation matrix based on the first orientation information.

In some embodiments, the computing device 230 based on the first position P1 and the second position P2, determining a first position P1 to a second position P2 of the direction vector, and the direction vector as a first orientation information.

As an example, in a VR shooting game, the virtual object 280 is a virtual firearm. The virtual firearm includes a handle and a barrel. When the virtual hands 270 corresponding to the user 210 hold the virtual firearm, one manipulation device is the main device and the other manipulation device is the secondary device. The main device and the secondary device can be distinguished by the main and secondary points of the firearm grip. For example, the first manipulation device 250 held by the left hand corresponds to the handle position and can be used as the main device; the second manipulation device 260 held by the right hand corresponds to the barrel position and can be used as the secondary device. Generally speaking, the orientation of the virtual firearm is directed from the first manipulation device 250 to the second manipulation device 260. Referring to FIG. 3, it can be represented by the direction vector F from the first position P1 to the second position P2. The orientation of the muzzle can be controlled through the direction vector F.

In some embodiments, the computing device 230 determines the forward vector of the first manipulation device 250 and uses it as the second orientation information. Further, the computing device 230 determines the second column vector in the rotation matrix based on the second orientation information. It should be understood that the forward vector can represent, for example, the orientation of the predetermined axis (e.g., the horizontal axis or the vertical axis) of the first manipulation device 250, or it can also represent the direction formed by two reference locations (e.g., the handle front end and the handle tail end) in the first manipulation device 250.

Continuing the example of a VR shooting game, the user 210 twists his wrist at various angles to control the virtual firearm to rotate around the axis of the barrel. Generally, the rotation of the virtual firearm is controlled by the rotation of the main device. Referring to FIG. 3, the rotation of the firearm around itself is controlled by the forward vector F1 of the first manipulation device 250.

In some embodiments, in order to determine the rotation matrix, the computing device 230 performs orthogonalization processing on the direction vector F and the forward vector F1 to determine the orthogonalized direction vector and the orthogonalized forward vector. Further, the computing device determines the first column vector and the second column vector of the rotation matrix based on the orthogonalized direction vector and the orthogonalized forward vector.

Orthogonalize the direction vector F and the forward vector F1, so that adjusting one of the vectors in different orthogonal dimensions will not or almost not affect the vector changes in other dimensions. Methods for orthogonalizing vectors include: Gram-Schimidt orthogonalization, improved Gram-Schmidt orthogonalization, Householder orthogonalization, Givens orthogonalization, etc.

In some embodiments, the computing device 230 performs Gram-Schmidt orthogonalization of the direction vector F and the forward vector F1 to obtain vectors F' and '. Gram-Schmidt orthogonalization of the direction vector F to obtain the orthogonalized direction vector F'; Gram-Schmidt orthogonalization of the forward vector F1 to obtain the orthogonalized forward vector U'. Specifically:

$$F' = \frac{F}{\|F\|} \tag{1}$$

$$U' = F1 - (F1 \cdot F')F' \tag{2}$$

In some embodiments, the computing device 230 based on the orthogonalized direction vector and the forward vector orthogonalization, cross product is determined. Further, the computing device 230 may calculate the orthogonalized direction vector F' and the forward vector orthogonalization U' cross product.

As an example, cross product is obtained by cross multiplying vectors F' and U'. Cross product is perpendicular to vector F', while cross product is perpendicular to vector U'. Cross product is obtained by cross multiplication and subtraction of components. In the case where only the direction of the vector is concerned and not the size of the vector, the cross product is further standardized, which can be expressed as:

$$R' = U' \times F' \tag{3}$$

Thus, further, computing device 230 may determine three corresponding column vectors in the rotation matrix, represented as first column vectors, second column vectors, and third column vectors, respectively, based on vectors F', U', and R'. In some embodiments, computing device 230 may determine column vectors corresponding to vectors F', U', and R' based on the coordinate system of virtual object 280 itself.

As an example, in game modeling, the coordinate system of virtual object 280 itself adopts a left-handed coordinate system, with the direction parallel to virtual object 280 being the Y-axis and the top of virtual object 280 being the Z-axis. After virtual object 280 rotates, the vector R' is reversed to the X-axis, the vector F' is coaxial with the Y-axis, and the vector U' is coaxial with the Z-axis in the coordinate system of virtual object 280 itself. Therefore, the third column vector corresponding to cross product can be represented as −R', the first column vector corresponding to orthogonalized direction vector can be represented as F', and the second column vector corresponding to orthogonalized forward vector can be represented as U.

In some embodiments, the computing device 230 determines the relative order of the first column vector, the second column vector, and the third column vector in the rotation matrix based on the coordinate system of the virtual object 280 itself. The relative order refers to the order in which the first column vector, the second column vector, and the third column vector are arranged based on the order of the coordinate axes. Accordingly, the computing device 230 can determine that the rotation matrix can be represented as [−R' F U']. Further, the computing device 230 can determine the pose of the virtual object 280 in the virtual environment 240 based on the rotation matrix.

In some embodiments, the computing device 230 draws the virtual object 280 in the virtual environment 240 and presents it as being held by the virtual hands 270. The computing device 230 derives a rotation matrix that describes the rotation of the virtual object 280 based on the position of the virtual hands 270. The rotation matrix can be applied to the mesh component of the virtual object 280, for example, to the mesh component of the firearm provided by the game engine interface, thereby drawing the virtual firearm held by the virtual hands 270. When the user 210 controls the virtual firearm by manipulating the device, it can obtain a natural handheld feel that meets the user 210's control expectations.

In some embodiments, the computing device 230 receives predetermined interactions for the first manipulation device 250. Further, the computing device 230 triggers virtual functions associated with the virtual object 280 based on such predetermined interactions. For example, in the virtual scene 240, the virtual hands 270 hold the virtual firearm, and when the user 210 instructs the operation of shooting through the first manipulation device 250, the computing device 230 controls the virtual firearm to fire a virtual bullet.

In summary, the various embodiments of the present disclosure control the rotation of the manipulated object through the rotation matrix constructed by two manipulation devices, achieving the pose of the manipulated object obtained through the position of both hands, and conforming to the user's realistic cognition. The orientation of the virtual object 280 is controlled by the direction vector from the first manipulation device 250 to the second manipulation device 260, and the virtual object 280 is controlled to rotate around itself through the forward vector of the first manipulation device 250. In this way, the user 210 can twist the main hand wrist at various angles to control the virtual object 280 to produce a natural and smooth rotation that meets expectations.

Example Process

FIG. 4 illustrates a flowchart of a process 400 for manipulating a virtual object in accordance with some embodiments of the present disclosure. Process 400 may be implemented at computing device 230. Process 400 is described below with reference to FIG. 2.

In frame 410, the computing device 230 determines a first position of the first manipulation device associated with a virtual environment and a second position of the second manipulation device associated with the virtual environment.

In frame 420, the computing device 230 determines the first orientation information based on the first position and the second position.

At block 430, the computing device 230 determines a rotation matrix associated with the virtual object rendered in the virtual environment based on the first orientation information and second orientation information of the first manipulation device.

In frame 430, the computing device 230 determines a pose of the virtual object in the virtual environment based on the rotation matrix.

In some embodiments, based on the first position and the second position, the computing device 230 determines a direction vector from a first position to a second position, as a first orientation information.

In some embodiments, the computing device 230 determines a forward vector of the first manipulation device as the second orientation information.

In some embodiments, the computing device 230 performs orthogonalization processing on the direction vector and the forward vector to determine the orthogonalized direction vector and the orthogonalized forward vector; and based on the orthogonalized direction vector and the orthogonalized forward vector, determining the rotation matrix.

In some embodiments, the computing device 230 determines a cross product based on the orthogonalized direction vector and the forward vector orthogonalization; and based on the orthogonalized direction vector, the orthogonalized forward vector and cross product, respectively, determines the rotation matrix column vector.

In some embodiments, a relative order of a first column vector corresponding to the orthogonalized direction vector, a second column vector corresponding to the orthogonalized forward vector and a third column vector corresponding to the cross product in the rotation matrix is determined based on a coordinate system of the virtual object.

In some embodiments, virtual objects are rendered in a virtual environment to be presented as being held by both hands.

In some embodiments, the computing device 230 receives a predetermined interaction for the first manipulation device; and triggers a virtual function associated with the virtual object in the virtual environment based on the predetermined interactions.

Example Apparatus and Equipment

Figure 5:
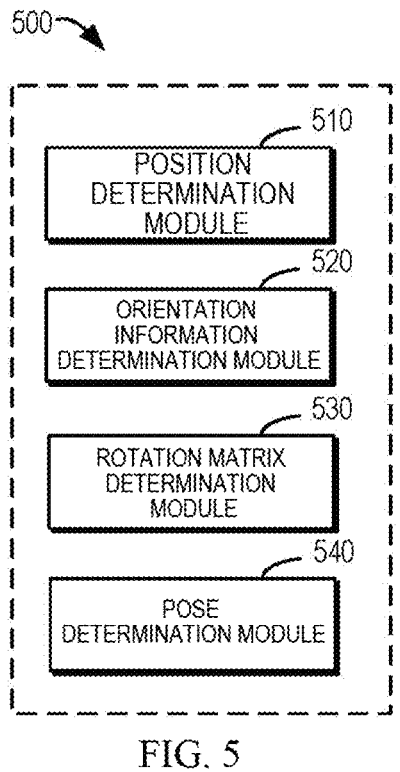
FIG. 5 shows a block diagram of a device for manipulating virtual objects according to some embodiments of the present disclosure.

FIG. 5 shows a schematic block diagram of an apparatus 500 for manipulating virtual objects in accordance with certain embodiments of the present disclosure. the apparatus 500 may be implemented as or included in the computing device 230.

As shown in the figure, the device 500 comprises a position determination module 510 configured to determine a first position of the first manipulation device associated with the virtual environment and a second position of the second manipulation device associated with the virtual environment. The device 500 also comprises an orientation information determination module 520 configured to determine the first orientation information based on the first position and the second position. The device 500 also comprises a rotation matrix determination module 530 configured to determine a rotation matrix associated with a virtual object rendered in the virtual environment based on the first orientation information and the second orientation information of the first manipulation device. The device 500 also comprises a pose determination module 540 configured to determine the pose of the virtual object in the virtual environment based on the rotation matrix.

In some embodiments, the orientation information determining module 520 is configured to: based on the first position and the second position, determine a direction vector from a first position to a second position, as a first orientation information.

In some embodiments, the orientation information determination module 520 is further configured to: determine a forward vector of the first manipulation device as the second orientation information.

In some embodiments, the rotation matrix determination module 530 is configured to: perform orthogonalization processing on the direction vector and the forward vector to determine the orthogonalized direction vector and the orthogonalized forward vector; and based on the orthogonalized direction vector and the orthogonalized forward vector, determine the rotation matrix.

In some embodiments, the rotation matrix determination module 530 is configured to: determine the cross product based on the orthogonalized direction vector and the orthogonalized forward vector; and based on the orthogonalized direction vector, the orthogonalized forward vector and cross product, determine column vectors of the rotation matrix respectively.

In some embodiments, a relative order of a first column vector corresponding to the orthogonalized direction vector, a second column vector corresponding to the orthogonalized forward vector and a third column vector corresponding to the cross product in the rotation matrix is determined based on a coordinate system of the virtual object.

In some embodiments, the virtual object is rendered in a virtual environment to be presented as being held by both hands.

In some embodiments, the apparatus 500 further comprises: a receiving module configured to receive a predetermined interaction for the first manipulation device; and a triggering module configured to trigger a virtual function associated with the virtual object in the virtual environment based on the predetermined interaction.

Figure 6:
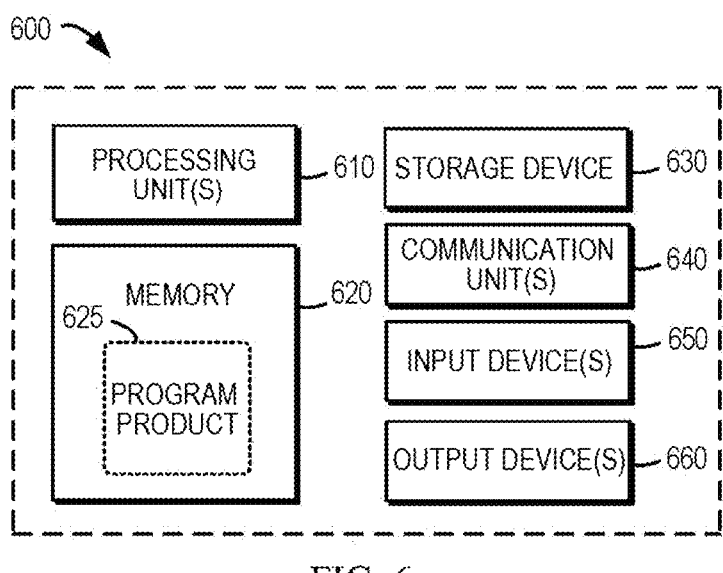
FIG. 6 shows a block diagram of a device that can implement multiple embodiments of the present disclosure.

FIG. 6 illustrates a block diagram illustrating an electronic device 600 in which one or more embodiments of the present disclosure may be implemented. It should be understood that the electronic device 600 shown in FIG. 6 is merely exemplary and should not constitute any limitation on the functionality and scope of the embodiments described herein. The electronic device 600 shown in FIG. 6 may be used to implement the computing device 230 of FIG. 2.

As shown in FIG. 6, the electronic device 600 is in the form of a general purpose electronic device. the components of the electronic device 600 may include, but are not limited to, one or more processors or processing units 610, memory 620, storage device 630, one or more communication units 640, one or more input devices 650, and one or more output devices 660. the processing unit 610 may be an actual or virtual processor and is capable of performing various processes based on programs stored in the memory 620. in a multiprocessor system, multiple processing units execute computer executable instructions in parallel to improve the parallel processing capability of the electronic device 600.

Electronic device 600 typically includes multiple computer storage media. Such media can be any accessible media accessible to electronic device 600, including but not limited to volatile and non-volatile media, removable and non-removable media. Memory 620 can be volatile memory (such as registers, caches, random access memory (RAM)), non-volatile memory (such as read-only memory (ROM), electrically erasable programmable read-only memory (EE-PROM), flash memory), or some combination thereof. Storage device 630 can be removable or non-removable media, and can include machine-readable media such as flash drives, disks, or any other media that can be used to store information and/or data (such as training data for training) and can be accessed within electronic device 600.

The electronic device 600 may further include additional removable/non-removable, volatile/non-volatile storage media. Although not shown in FIG. 6, a disk drive for reading or writing from a removable, non-volatile disk (e.g., "floppy disk") and an optical disk drive for reading or writing from a removable, non-volatile optical disk may be provided. In these cases, each drive may be connected to a bus (not shown) by one or more data media interfaces. The memory 620 may include a computer program product 625 having one or more program modules configured to perform various methods or actions of various embodiments of the present disclosure.

The communication unit 640 implements communication with other electronic devices through a communication medium. additionally, the functions of the components of the electronic device 600 may be implemented in a single computing cluster or multiple computing machines capable of communicating through a communication connection. thus, the electronic device 600 may operate in a networked environment using logical connections with one or more other servers, a network personal computer (PC), or another network node.

The input device 650 may be one or more input devices, such as a mouse, keyboard, trackball, etc. The output device 660 may be one or more output devices, such as a display, speaker, printer, etc. The electronic device 600 may also communicate, as desired, via the communication unit 640, with one or more external devices (not shown), such as storage devices, display devices, etc., with one or more devices that enable a user to interact with the electronic device 600, or with any device (e.g., network interface card, modem, etc.) that enables the electronic device 600 to communicate with one or more other electronic devices. Such communication may be performed via an input/output (I/O) interface (not shown).

According to an exemplary implementation of the present disclosure, there is provided a computer-readable storage medium having computer-executable instructions stored thereon, wherein the computer-executable instructions are executed by a processor to implement the methods described above. According to an exemplary implementation of the present disclosure, there is also provided a computer program product that is tangibly stored on a non-transitory computer-readable medium and includes computer-executable instructions that are executed by a processor to implement the methods described above.

Various aspects of the present disclosure are described herein with reference to flowcharts and/or block diagrams of methods, apparatus, apparatus, and computer program products implemented in accordance with the present disclosure. It should be understood that each block of the flowcharts and/or block diagrams and combinations of the blocks in the flowcharts and/or block diagrams can be implemented by computer-readable program instructions.

These computer-readable program instructions may be provided to a processing unit of a general purpose computer, special purpose computer, or other programmable data processing device to produce a machine that, when executed by a processing unit of a computer or other programmable data processing device, produces a device that implements the functions/actions specified in one or more blocks in the flowchart and/or block diagrams. These computer-readable program instructions may also be stored in a computer-readable storage medium, which causes the computer, programmable data processing device, and/or other device to operate in a specific manner. Thus, the computer-readable medium storing the instructions includes an article of manufacture that includes instructions for implementing various aspects of the functions/actions specified in one or more blocks in the flowchart and/or block diagrams.

Computer-readable program instructions can be loaded onto a computer, other programmable data processing device, or other device to perform a series of operational steps on the computer, other programmable data processing device, or other device to produce a computer-implemented process, so that the instructions executed on the computer, other programmable data processing device, or other device implement the functions/actions specified in one or more blocks in the flowchart and/or block diagram.

The flowcharts and block diagrams in the accompanying drawings show the architecture, functions, and operations of possible implementations of systems, methods, and computer program products according to the present disclosure. In this regard, each block in the flowcharts or block diagrams may represent a module, program segment, or part of an instruction that contains one or more executable instructions for implementing a specified logical function. In some alternative implementations, the functions marked in the blocks may also occur in a different order than those marked in the drawings. For example, two consecutive blocks can actually be executed in parallel, and they can sometimes be executed in the opposite order, depending on the functions involved. It should also be noted that each block in the diagrams and/or flowcharts, as well as combinations of blocks in the diagrams and/or flowcharts, can be implemented using a dedicated hardware-based system that performs the specified functions or actions, or can be implemented using a combination of dedicated hardware and computer instructions.

The above has described the various implementations of the present disclosure. The above description is exemplary, not exhaustive, and is not limited to the various implementations disclosed. Without departing from the scope and spirit of the various implementations described, many modifications and changes are obvious to those skilled in the art. The choice of terminology used in this article is intended to best explain the principles, practical applications, or improvements to the technology in the market, or to enable other ordinary technicians in the art to understand the various implementations disclosed in this article.

We claim:

1. A method for manipulating a virtual object, comprising:
    determining a first position of a first manipulation device associated with a virtual environment and a second position of a second manipulation device associated with the virtual environment;
    determining first orientation information based on the first position and the second position;
    determining a rotation matrix associated with a virtual object rendered in the virtual environment based on the first orientation information and second orientation information of the first manipulation device; and
    determining a pose of the virtual object in the virtual environment based on the rotation matrix.

2. The method of claim 1, wherein determining the first orientation information comprises:
    based on the first position and the second position, determining a direction vector from the first position to the second position, as the first orientation information.

3. The method of claim 2, further comprising:
    determining a forward vector of the first manipulation device as the second orientation information.

4. The method of claim 3, wherein determining a rotation matrix associated with a virtual object rendered in the virtual environment comprises:
    performing orthogonalization processing on the direction vector and the forward vector to determine an orthogonalized direction vector and an orthogonalized forward vector; and
    based on the orthogonalized direction vector and the orthogonalized forward vector, determining the rotation matrix.

5. The method of claim 4, wherein determining the rotation matrix comprises:
    determining a cross product based on the orthogonalized direction vector and the orthogonalized forward vector; and
    based on the orthogonalized direction vector, the orthogonalized forward vector and the cross product, determining the column vector of the rotation matrix respectively.

6. The method of claim 5, wherein a relative order of a first column vector corresponding to the orthogonalized direction vector, a second column vector corresponding to the orthogonalized forward vector and a third column vector corresponding to the cross product in the rotation matrix is determined based on a coordinate system of the virtual object.

7. The method of claim 1, wherein the virtual object is rendered in the virtual environment to be presented as being held by both hands.

8. The method of claim 1, further comprising:
    receiving a predetermined interaction for the first manipulation device; and
    triggering a virtual function associated with the virtual object in the virtual environment based on the predetermined interaction.

9. An electronic device comprising:
    at least one processing unit; and
    at least one memory, the at least one memory being coupled to the at least one processing unit and storing instructions for execution by the at least one processing unit, the instructions, when executed by the at least one processing unit, causing the electronic device to perform a method comprising:
        determining a first position of a first manipulation device associated with a virtual environment and a second position of a second manipulation device associated with the virtual environment;
        determining first orientation information based on the first position and the second position;
        determining a rotation matrix associated with a virtual object rendered in the virtual environment based on the first orientation information and second orientation information of the first manipulation device; and
        determining a pose of the virtual object in the virtual environment based on the rotation matrix.

10. The electronic device of claim 9, wherein determining the first orientation information comprises:

based on the first position and the second position, determining a direction vector from the first position to the second position, as the first orientation information.

11. The electronic device of claim 10, further comprising:
determining a forward vector of the first manipulation device as the second orientation information.

12. The electronic device of claim 11, wherein determining a rotation matrix associated with a virtual object rendered in the virtual environment comprises:
performing orthogonalization processing on the direction vector and the forward vector to determine an orthogonalized direction vector and an orthogonalized forward vector; and
based on the orthogonalized direction vector and the orthogonalized forward vector, determining the rotation matrix.

13. The electronic device of claim 12, wherein determining the rotation matrix comprises:
determining a cross product based on the orthogonalized direction vector and the orthogonalized forward vector; and
based on the orthogonalized direction vector, the orthogonalized forward vector and the cross product, determining the column vector of the rotation matrix respectively.

14. The electronic device of claim 13, wherein a relative order of a first column vector corresponding to the orthogonalized direction vector, a second column vector corresponding to the orthogonalized forward vector and a third column vector corresponding to the cross product in the rotation matrix is determined based on a coordinate system of the virtual object.

15. The electronic device of claim 9, wherein the virtual object is rendered in the virtual environment to be presented as being held by both hands.

16. The electronic device of claim 1, further comprising:
receiving a predetermined interaction for the first manipulation device; and
triggering a virtual function associated with the virtual object in the virtual environment based on the predetermined interaction.

17. A non-transitory computer readable storage medium having stored thereon a computer program executable by a processor to implement a method comprising:
determining a first position of a first manipulation device associated with a virtual environment and a second position of a second manipulation device associated with the virtual environment;
determining first orientation information based on the first position and the second position;
determining a rotation matrix associated with a virtual object rendered in the virtual environment based on the first orientation information and second orientation information of the first manipulation device; and
determining a pose of the virtual object in the virtual environment based on the rotation matrix.

18. The non-transitory computer readable storage medium of claim 17, further comprising:
determining a forward vector of the first manipulation device as the second orientation information.

19. The non-transitory computer readable storage medium of claim 18, wherein determining a rotation matrix associated with a virtual object rendered in the virtual environment comprises:
performing orthogonalization processing on the direction vector and the forward vector to determine an orthogonalized direction vector and an orthogonalized forward vector; and
based on the orthogonalized direction vector and the orthogonalized forward vector, determining the rotation matrix.

20. The non-transitory computer readable storage medium of claim 19, wherein determining the rotation matrix comprises:
determining a cross product based on the orthogonalized direction vector and the orthogonalized forward vector; and
based on the orthogonalized direction vector, the orthogonalized forward vector and the cross product, determining the column vector of the rotation matrix respectively.

* * * * *